:::

United States Patent
Sierecki

(10) Patent No.: US 8,619,597 B2
(45) Date of Patent: Dec. 31, 2013

(54) LAYER 2/LAYER 3 INTERWORKING VIA PHYSICAL LOOPBACK

(75) Inventor: Edward Alan Sierecki, Concord, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 458 days.

(21) Appl. No.: 12/407,020

(22) Filed: Mar. 19, 2009

(65) Prior Publication Data

US 2009/0180481 A1    Jul. 16, 2009

Related U.S. Application Data

(63) Continuation of application No. 10/718,529, filed on Nov. 24, 2003, now Pat. No. 7,522,532.

(51) Int. Cl.
*G06F 11/00* (2006.01)

(52) U.S. Cl.
USPC ........... 370/249; 370/222; 370/223; 370/224; 370/225; 714/2

(58) Field of Classification Search
USPC ............... 370/216–221, 228, 242, 244–245, 370/247–252, 389, 392, 395.32, 370/395.5–395.52, 400–401, 419, 469; 714/1–2, 25, 47, 716–717; 709/220–224, 238, 239, 243
See application file for complete search history.

(56) References Cited

U.S. PATENT DOCUMENTS

| | | | |
|---|---|---|---|
| 5,923,643 A | 7/1999 | Higgins et al. | |
| 5,999,518 A | 12/1999 | Nattkemper et al. | |
| 6,108,300 A * | 8/2000 | Coile et al. | 370/217 |
| 6,304,547 B1 | 10/2001 | Tsuruta et al. | |
| 6,480,888 B1 | 11/2002 | Pedersen | |
| 6,519,658 B2 * | 2/2003 | Farnworth et al. | 710/13 |
| 6,574,240 B1 * | 6/2003 | Tzeng | 370/469 |
| 6,587,467 B1 | 7/2003 | Morgenstern et al. | |
| 6,611,522 B1 * | 8/2003 | Zheng et al. | 370/395.21 |
| 6,614,792 B1 | 9/2003 | Pazy et al. | |
| 6,751,191 B1 * | 6/2004 | Kanekar et al. | 370/217 |
| 6,775,271 B1 * | 8/2004 | Johnson et al. | 370/352 |
| 6,795,933 B2 * | 9/2004 | Wachel | 714/4 |
| 6,798,788 B1 * | 9/2004 | Viswanath et al. | 370/469 |
| 6,895,024 B1 | 5/2005 | Drake et al. | |

(Continued)

OTHER PUBLICATIONS

Microsoft et al., "An Interoperable End-to-End Broadband Service Architecture over ADSL Systems," (Jul. 1997).

(Continued)

*Primary Examiner* — Redentor Pasia
(74) *Attorney, Agent, or Firm* — Greenblum & Bernstein, P.L.C.

(57) ABSTRACT

A method for transmitting data in a layer two network having layer three routing capabilities includes transmitting, via a physical loopback, the data from a layer two switching component of a multi service platform to a layer three switching component of the multi service platform. The data specifies an initial routing path for the data that identifies a first layer two switch, and the method includes determining a new routing path for the data, the new routing path identifying a second layer two switch different than the first layer two switch. The method also includes updating the data to specify the new routing path, and transmitting, via the physical loopback, the data that specifies the new routing path from the layer three switching component to the layer two switching component.

20 Claims, 5 Drawing Sheets

(56) References Cited

U.S. PATENT DOCUMENTS

| | | | |
|---|---|---|---|
| 6,909,716 B1 * | 6/2005 | Johnson et al. | 370/392 |
| 6,909,720 B1 | 6/2005 | Willis | |
| 6,928,049 B2 | 8/2005 | Shabtay et al. | |
| 7,058,060 B2 | 6/2006 | Oono et al. | |
| 7,075,928 B1 | 7/2006 | Branth et al. | |
| 7,079,485 B1 | 7/2006 | Lau et al. | |
| 7,085,224 B1 * | 8/2006 | Oran | 370/216 |
| 7,120,834 B1 * | 10/2006 | Bishara | 714/43 |
| 7,130,276 B2 | 10/2006 | Chen et al. | |
| 7,209,657 B1 | 4/2007 | Islam | |
| 7,333,427 B2 * | 2/2008 | Jung | 370/220 |
| 7,522,532 B2 * | 4/2009 | Sierecki | 370/249 |
| 7,707,281 B2 * | 4/2010 | Baretzki | 709/224 |
| 2001/0032265 A1 | 10/2001 | Tanaka | |
| 2002/0031141 A1 | 3/2002 | McWilliams | |
| 2002/0089985 A1 | 7/2002 | Wahl et al. | |
| 2003/0043791 A1 | 3/2003 | Kato | |
| 2004/0143781 A1 | 7/2004 | DiMambro et al. | |
| 2005/0028164 A1 | 2/2005 | Neuwald et al. | |
| 2005/0100024 A1 | 5/2005 | Liu et al. | |
| 2007/0031153 A1 | 2/2007 | Aronson | |

OTHER PUBLICATIONS

Nortel Networks, "Passport Multiservice Switch Portfolio".
Alcatel "Alcatel 7670 Routing Switch Platform (RSP)".

* cited by examiner

LAYER 2/LAYER 3 INTERWORKING VIA PHYSICAL LOOPBACK

CROSS REFERENCE TO PARENT APPLICATION

This application is a continuation of pending U.S. patent application Ser. No. 10/718,529, filed Nov. 24, 2003, which is expressly incorporated herein by reference in its entirety.

CROSS REFERENCE TO RELATED APPLICATION

The present application is related to a U.S. patent application Ser. No. 10/704,715, filed on Nov. 12, 2003, now U.S. Pat. No. 7,450,592, issued Nov. 11, 2008, in the names of K. LIU et al., the disclosure of which is expressly incorporated by reference herein in its entirety.

BACKGROUND OF THE INVENTION

1. Field of the Invention

The present invention relates to the field of communications. More particularly, the present invention relates to improving reliability when adding layer three routing to layer two networks.

2. Background Information

FIG. 1 illustrates an example of today's networking environment in which layer two networks are provided with layer three routing. In today's networking environment, a customer edge device 10 connects to a layer two switch 12, such as an ATM switch or a frame relay switch. The switches 12 are interconnected with interoffice trunks 14. The connection 16 between the switch and the customer edge device 10 can be any known interface.

In an asynchronous transfer mode (ATM) example, a permanent virtual connection (PVC) 18 is configured from the ATM switch port connecting to the customer edge device 10 to a trunk 15 terminating at the far end of the switch 12. The trunk 15 is similar to the other trunks 14 shown, except, the trunk 15 is partitioned. The partitioning is required to separate a user-network interface (UNI) e.g., an Internet protocol (IP) interface, from the standard layer two trunk group. At least one partition is required for the standard ATM trunks, and another partition is required for each IP interface that is defined. Complex provisioning and associated administrative burden are required to partition the trunk 15.

The IP interface across the trunk 15 is defined between the switch 12 and a platform 20, such as an Alcatel 7670 RSP (routing switch platform), available from Compagnie Financiere Alcatel of France. The defined IP interface on the ATM trunk 15 uses standard ATM encapsulation. The defined IP interface must also specify a virtual path identifier/virtual channel identifier (VPI/VCI) of the PVC connection 18, associated with the IP service, to the customer edge device 10.

The platform 20 includes layer two switching capabilities and layer three switching capabilities. In today's multi service platforms 20, the layer two portion is independent from and isolated from the layer three portion. Typically, a layer three port 22 of the multi service platform 20 terminates the UNI connection 15.

A problem associated with the current configuration is that when the UNI connection 15 (either the link or a port) fails, the layer two network will not re-route a circuit to the multi service platform 20 because the layer two network only extends to the connection 15. In other words, the PVC 18 terminates on the layer two switch 12, and not on the platform 20. Thus, no layer two protection is available for the trunk 15 between the switch 12 and the platform 20. If the trunk 15 fails, all customers using the link 15 would be out of service.

Current solutions addressing the single point of failure problem include dual homing from a customer site 10 to two different platforms 20. In this case, when one connection fails, the other connection can maintain connectivity. This approach, however, consumes too many network resources by requiring both paths to be permanently maintained, adding significant complexity to the provisioning and maintenance procedures for this service.

Another solution reduces the length of the connection between the switch 12 and the platform 20 by deploying the switches 12 and platforms 20 within the same central office. Thus, the connection 15 becomes an intra-central office connection. This solution, however, increases the overall switch deployment cost and is still subject to a single point of failure.

Thus, a solution is needed to address the single point of failure problem and the complexity of provisioning problem without increasing consumption of network resources.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
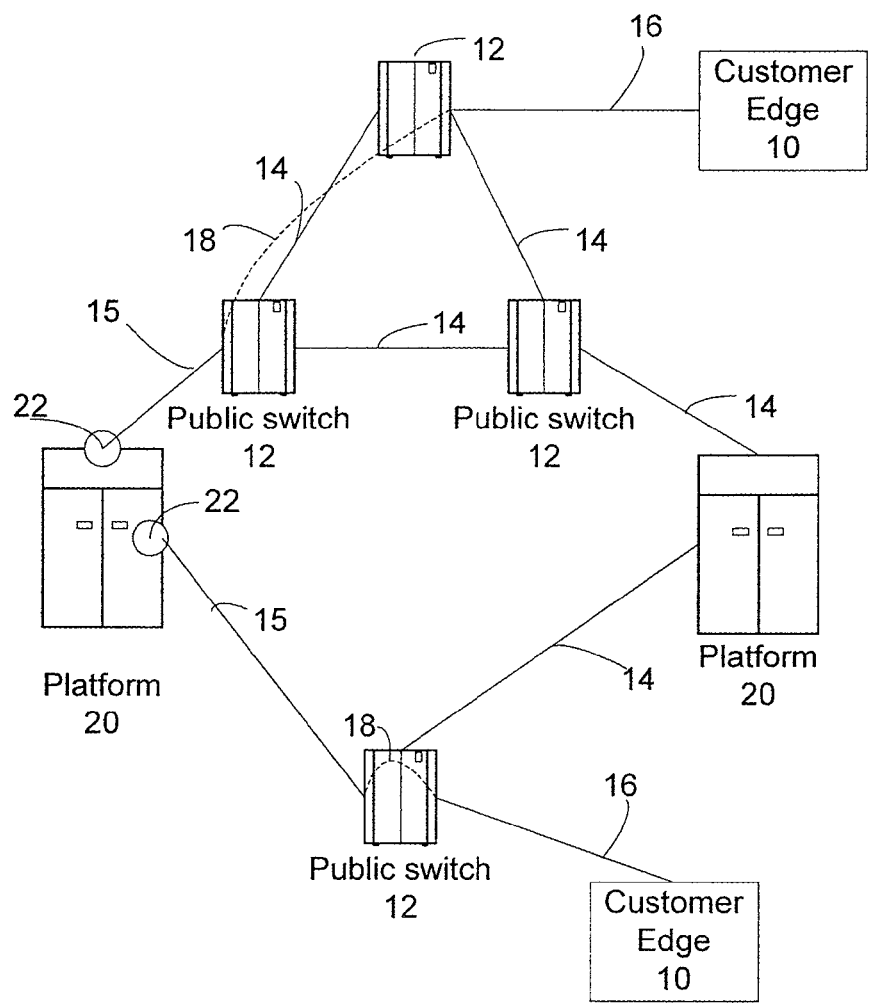
FIG. 1 is a diagram showing a prior art networking environment.

The present invention relates to increasing reliability of interconnected layer two and layer three networks. The increased reliability is achieved by providing a physical loopback between layer two and layer three switching components within a multi service platform.

In view of the above, the present invention through one or more of its various aspects and/or embodiments is presented to accomplish one or more objectives and advantages, such as those noted below.

According to an aspect of the present invention, a multi service platform includes a layer two switching component, a layer three switching component, and a physical loopback. The physical loopback connects the layer two switching component and the layer three switching component. The layer two capabilities and layer three capabilities are, therefore, integrated together. The physical loopback may be a fiber jumper cable.

In one embodiment, the layer two switching component and the layer three switching component are on a line card. Both ends of the loopback may terminate on the line card. At least one additional physical loopback may be provided, connecting to another layer three switching component on the line card. Thus, redundancy for the layer three functionality is provided on the line card. At least one additional line card may include another layer two switching component and another layer three switching component. Thus, the at least one additional line card provides redundancy. The additional line card(s) may include at least one additional physical loopback terminating on the additional line card(s).

According to another aspect of the present invention, a network includes multiple layer two switches, and at least one platform. The platform includes a layer two switching component, a layer three switching component and a physical loopback between the layer two switching component and the layer three switching component. The network also includes at least one connection between one of the layer two switches, which communicates with a customer edge device, and the layer two switching component of the platform. Thus, a failure of the connection, which extends to the platform, is protected by layer two network failure restoration.

The layer two network switches may be ATM switches. Moreover, the connection(s) may be a permanent virtual connection (PVC). Further, the layer two switching component of the platform may be an ATM switch, and the layer three switching component of the platform may be an IP router.

In yet another aspect, a method is provided for routing traffic across a layer two network having layer three routing capabilities. The method includes routing traffic from a customer across the layer two network to a layer two switching component in a platform, and routing traffic from the layer two switching component across a physical loopback to a layer three switching component in the platform. The method also includes determining, at the layer three switching component, where to route the traffic, returning the traffic to the layer two switching component, and forwarding the traffic to a destination based upon the determined route. In one embodiment, the layer two network is an ATM network.

The various aspects and embodiments of the present invention are described in detail below.

The present invention improves reliability of layer two networks having layer three routing by extending the layer two network to a layer two switching component of a multi service platform. Thus, if an interface between the layer two switch and the layer two switching component of the multi service platform fails, the layer two network failure recovery scheme re-routes the circuit to the layer two portion of the multi service platform.

Figure 2:
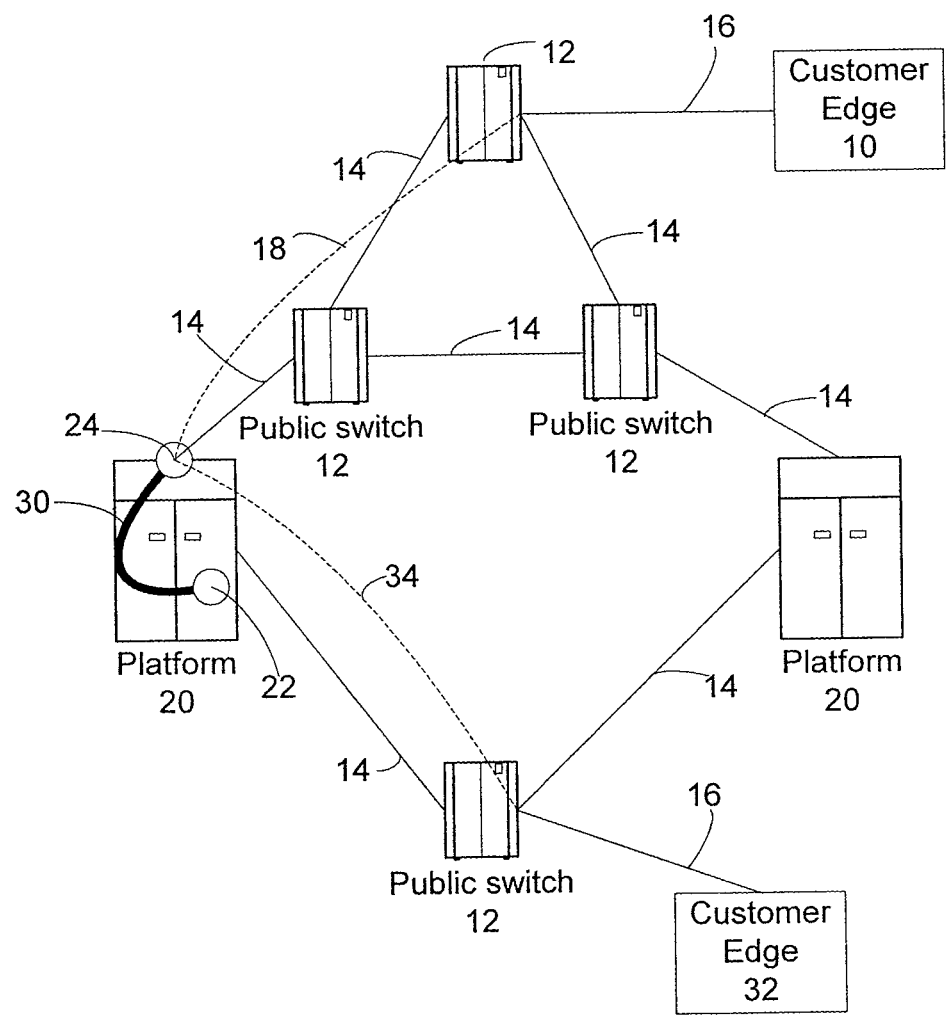
FIG. 2 is a diagram showing a networking environment, according to an aspect of the present invention.

Referring now to FIG. 2, an embodiment of the present invention is shown. The multi service platform 20 includes a physical loopback 30 which connects the layer two switching component 24 of the platform 20 and a layer three switching component 22 of the platform 20. In one embodiment, the loopback 30 is an OC3 or OC12 fiber jumper cable. The cable may be approximately two feet long. Of course the loopback 30 is not limited to this length and is also not limited to the OC3 or OC12 throughput values. The layer two and layer three portions 22, 24 may be provided on a line card, e.g., an Alcatel MR8, within the platform 20.

In one embodiment, the layer two network is an ATM network, and the layer three network is an IP network, although any other type of layer two and layer three networks can be provided, for example, ethernet, frame relay and multiprotocol label switching (MPLS). In the ATM/IP embodiment, the multi service platform 20 includes an ATM switch as the layer two portion 24 and an IP router as the layer three portion 22.

In the ATM/IP embodiment, the ATM network terminates on the ATM switching component 24 in the platform 20. That is, a PVC 18 connects all the way to the ATM port 24. Although a PVC is described in this example, any other type of ATM connection, e.g., a switched virtual connection (SVC) can be used. The physical loopback 30 connects the IP component 22 and the ATM component 24. Thus, the ATM network includes the ATM switch 24 on the platform 20 and accordingly protects against ATM trunk 14 failures for all trunks terminating on the switch with its failure restoration.

The physical loopback 30 thus becomes the only unprotected link. The failure probability of the link 30 is low, however, because the link is so short. Moreover, the reliability is further enhanced by the extension of the layer two network recovery scheme.

When data arrives at the ATM port 24 from the PVC 18, the cells are forwarded to the IP interface 22. The IP interface then performs an IP look-up to determine the destination of the traffic. The traffic is then returned to the ATM component 24 and ultimately to its destination 32 via, e.g., another PVC 34.

Figure 3A:
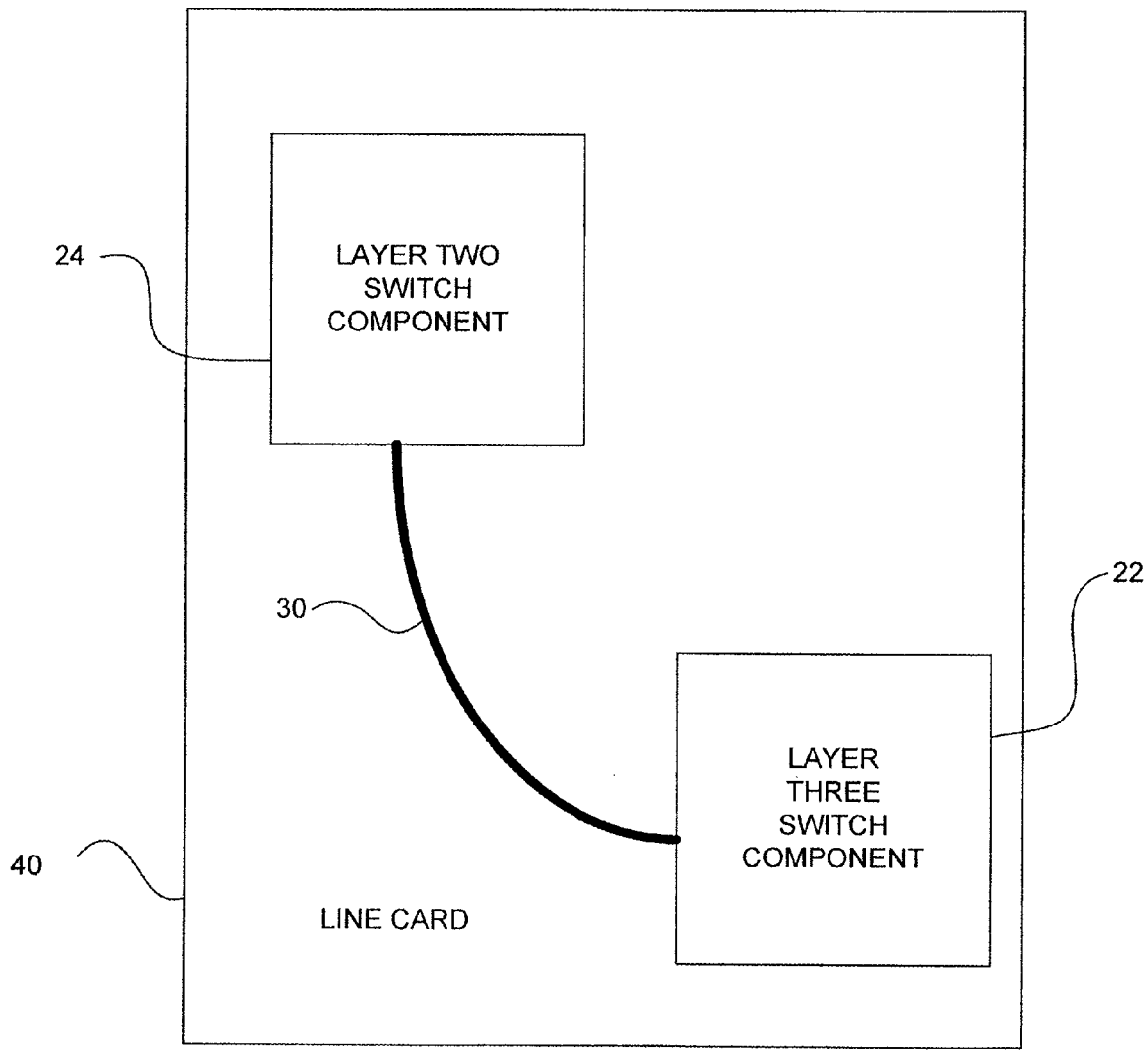
FIG. 3A is a diagram showing a line card.

Referring now to FIG. 3A, the platform of an exemplary embodiment includes a line card 40 including a layer two switching component 24 and a layer three switching component 22. The platform also includes a loopback 30 having both ends of the loopback terminate on the line card 40.

Figure 3B:
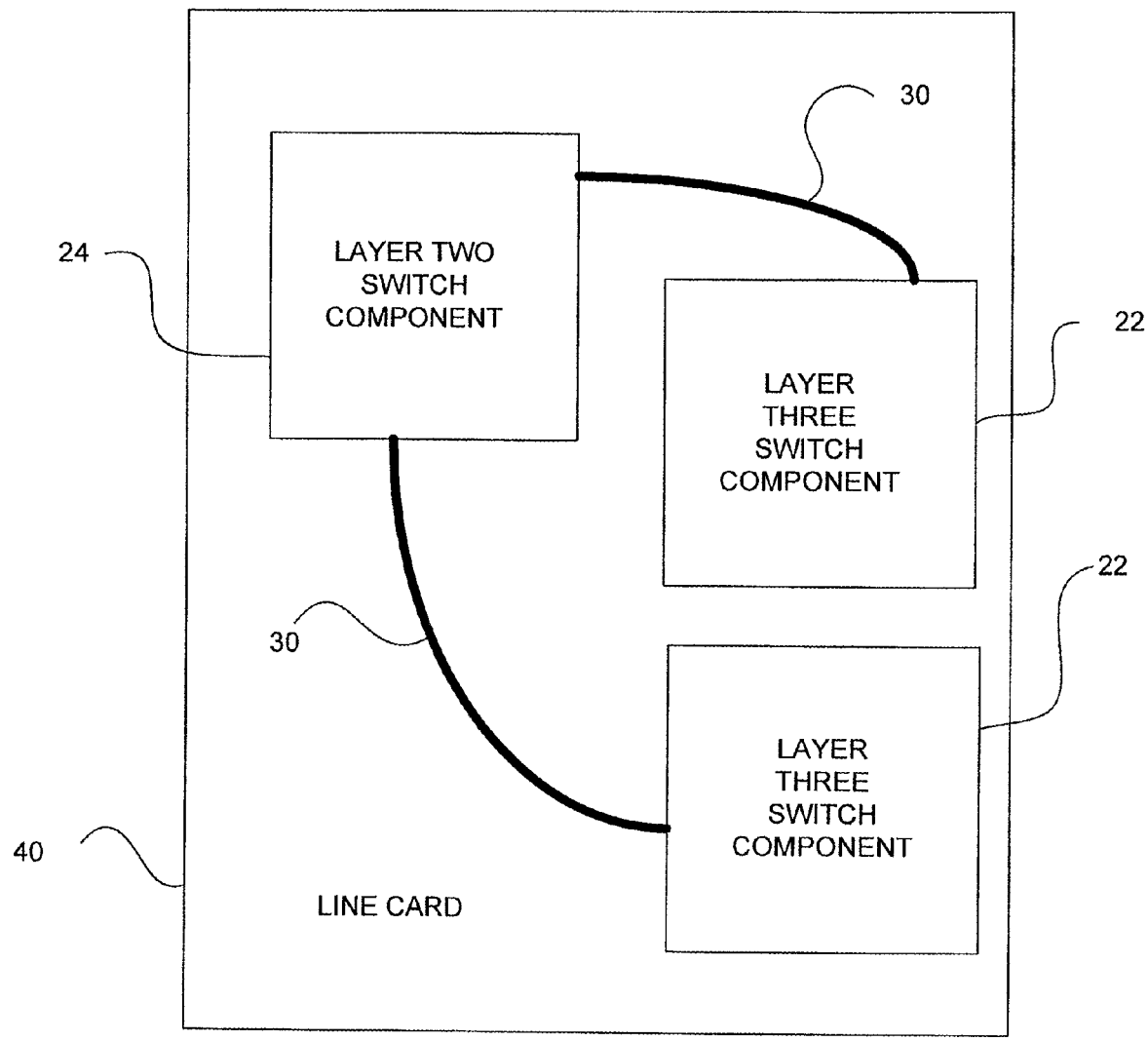
FIG. 3B is a diagram showing a line card having one additional loopback.

Referring now to FIG. 3B, the platform of an exemplary embodiment includes a line card 40 having at least one additional physical loopback 30 connecting to another layer three switching component 22 on the line card 40, wherein redundancy for the layer three functionality is provided on the line card 40.

Figure 3C:
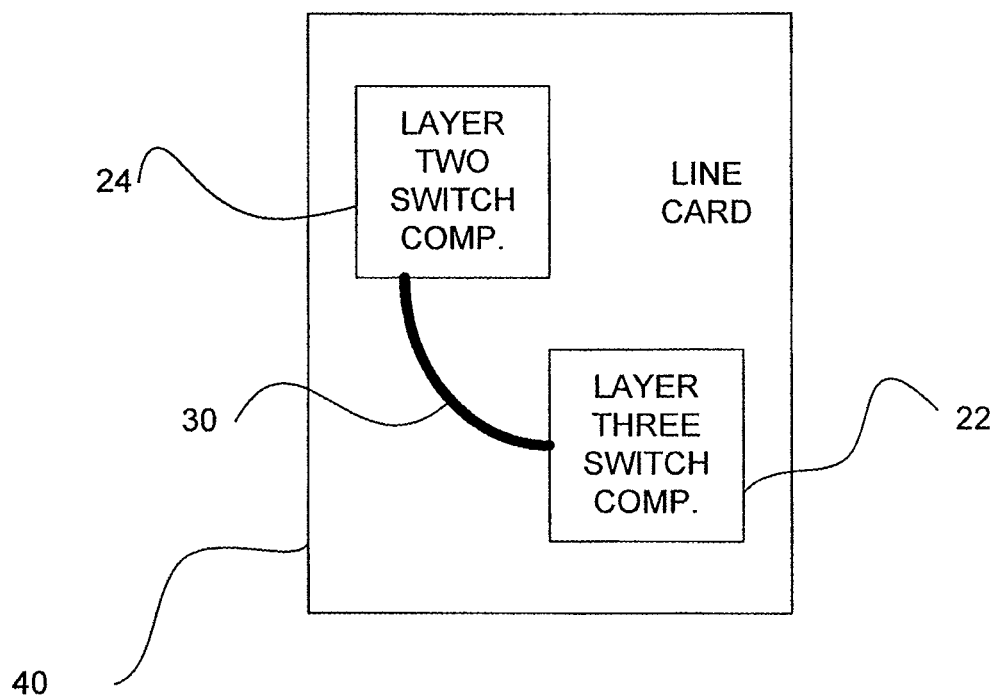
FIG. 3C is a diagram showing two line cards.
Figure 3C:
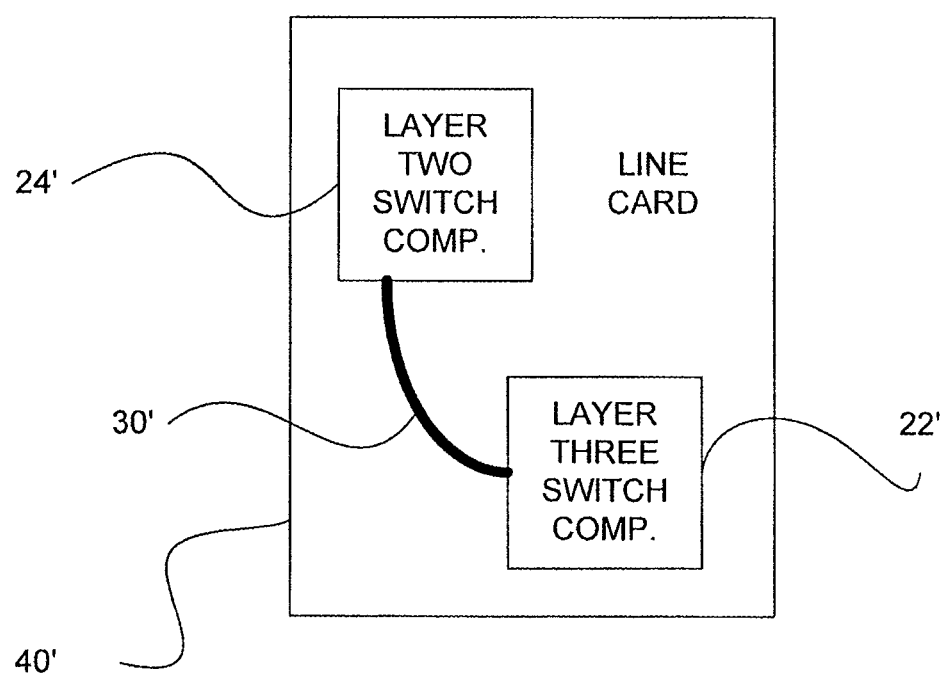

Referring now to FIG. 3C, the platform of an exemplary embodiment includes at least one additional line card 40' comprising at least one additional layer two switching component 24' and at least one additional layer three switching component 22', wherein the at least one additional line card 40' provides redundancy.

In one embodiment, both ends of the loopback 30 are on the same line card. Thus, the IP functionality is isolated to a single card, permitting protection with line card redundancy. In a further embodiment, redundant physical loopbacks are provided. That is, each card can be provided with a physical loopback 30. Line card redundancy could also be implemented on a single line card for each platform to provide redundancy for the layer three functionality. Redundancy on line cards terminating layer two trunks is less critical because layer two re-routing occurs if these cards fail.

An advantage of the present invention is that all UNIs can be provisioned to the same layer two switching component 24. Then, the loopback 30 can extend from the port 24 to the IP interface 22. Accordingly, end-to-end ATM connections can be provided. In other words, the ATM trunks 14 remain as pure ATM connections, obviating the need to partition the trunks 14 to provide separate IP interfaces. Consequently, existing CACing and bandwidth engineering methods can still be used. Moreover, simplified provisioning and better ATM bandwidth utilization occur.

Thus, the present invention provides a physical loopback connection between layer two and layer three switching components of a multi service platform thereby improving end to end reliability. It is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for layer two and layer three transmission represent examples of the state of the art. Such standards are periodically superseded by faster or more efficient equivalents having essentially the same functions. Accordingly, replacement standards and protocols having the same functions are considered equivalents.

What is claimed is:

1. A method for transmitting data in a layer two network having layer three routing capabilities, the method comprising:
    receiving the data by a layer two switching component of a multi service platform, the data specifying an initial routing path extending from the layer two switching component of the multi service platform through the layer two network;
    detecting a failure of the initial routing path of the data that extends from the layer two switching component of the multi service platform through the layer two network;
    transmitting, via a physical loopback, the data from the layer two switching component of the multi service platform to a layer three switching component of the multi service platform in response to the detecting of the failure of the initial routing path;
    determining a new routing path for the data from the layer two switching component through the layer two network that is different than the initial routing path;
    updating the data to specify the new routing path; and
    returning, via the physical loopback, the data that specifies the new routing path from the layer three switching component back to the layer two switching component.

2. The method as set forth in claim 1, wherein
    the initial routing path includes a layer two switch that is interconnected with the layer two switching component via an interface, and
    the data is transmitted from the layer two switching component to the layer three switching component via the physical loopback in response to a failure of the interface.

3. The method as set forth in claim 1, wherein
    the initial routing path includes a layer two switch, and
    the data is transmitted from the layer two switching component to the layer three switching component via the physical loopback in response to a failure of the layer two switch.

4. The method as set forth in claim 1, further comprising:
    performing, by the layer three switching component, a look-up of a destination of the data transmitted to the layer three switching component; and
    determining, by the layer three switching component, the new routing path based on the destination.

5. The method as set forth in claim 1, further comprising:
    redundantly transmitting the data, via a redundant physical loopback, from the layer two switching component to a redundant layer three switching component to provide redundancy of the layer three switching component.

6. The method as set forth in claim 1, wherein the layer two switching component and the layer three switching component are on a line card.

7. The method as set forth in claim 1, wherein the layer two switching component of the multi service platform comprises an asynchronous transfer mode switch.

8. The method as set forth in claim 1, wherein the layer three switching component of the multi service platform comprises an Internet Protocol router.

9. A multi service platform, comprising:
    a layer two switching component that transmits data in a layer two network;
    a layer three switching component;
    a physical loopback interconnecting the layer three switching component and the layer two switching component;
    a processor; and
    a memory storing instructions that, when executed by the processor, cause the processor to perform operations including:
        receiving the data by the layer two switching component, the data specifying an initial routing path extending from the layer two switching component through the layer two network;
        detecting a failure of the initial routing path of the data that extends from the layer two switching component through the layer two network;
        transmitting the data from the layer two switching component to the layer three switching component via the physical loopback in response to the detecting of the failure of the initial routing path;
        determining a new routing path for the data that extends from the layer two switching component through the layer two network that is different than the initial routing path;
        updating the data to specify the new routing path; and
        returning the data that specifies the new routing path back to the layer two switching component via the physical loopback.

10. The multi service platform as set forth in claim 9, wherein
    the initial routing path includes a layer two switch that is interconnected with the layer two switching component via an interface, and
    the processor transmits the data to the layer three switching component via the physical loopback in response to a failure of the interface.

11. The multi service platform as set forth in claim 9, wherein
    the initial routing path includes a layer two switch, and
    the processor transmits the data to the layer three switching component via the physical loopback in response to a failure of the layer two switch.

12. The multi service platform as set forth in claim 9, wherein the processor performs a look up to determine a destination of the data transmitted from the layer two switching component to the layer three switching component and determines the new routing path based on the destination.

13. The multi service platform as set forth in claim 9, wherein the physical loopback is a fiber jumper cable.

14. The multi service platform as set forth in claim 9, further comprising:
   a line card including the layer two switching component and the layer three switching component.

15. The multi service platform as set forth in claim 9, further comprising:
   a redundant physical loopback interconnecting a redundant layer three switching component and the layer two switching component to provide redundancy of the layer three switching component.

16. A non-transitory computer-readable storage medium encoded with an executable computer program for transmitting data in a layer two network having layer three routing capabilities that, when executed by a processor, causes the processor to perform operations comprising:
   receiving the data by a layer two switching component of a multi service platform, the data specifying an initial routing path extending from the layer two switching component of the multi service platform through the layer two network;
   detecting a failure of the initial routing path of the data that extends from the layer two switching component of the multi service platform through the layer two network;
   transmitting, via a physical loopback, the data from the layer two switching component of the multi service platform to a layer three switching component of the multi service platform in response to the detecting of the failure of the initial routing path;
   determining a new routing path for the data from the layer two switching component through the layer two network that is different than the initial routing path;
   updating the data to specify the new routing path; and
   returning, via the physical loopback, the data that specifies the new routing path from the layer three switching component back to the layer two switching component.

17. The non-transitory computer-readable storage medium as set forth in claim 16, wherein
   the initial routing path includes a layer two switch that is interconnected with the layer two switching component via an interface, and
   the data is transmitted from the layer two switching component to the layer three switching component via the physical loopback in response to a failure of the interface.

18. The non-transitory computer-readable storage medium as set forth in claim 16, wherein
   the initial routing path includes a layer two switch, and
   the data is transmitted from the layer two switching component to the layer three switching component via the physical loopback in response to a failure of the layer two switch.

19. The non-transitory computer-readable storage medium as set forth in claim 16, the operations further comprising:
   performing a look-up of a destination of the data transmitted to the layer three switching component; and
   determining the new routing path based on the destination.

20. The non-transitory computer-readable storage medium as set forth in claim 16, the operations further comprising:
   redundantly transmitting the data, via a redundant physical loopback, from the layer two switching component to a redundant layer three switching component to provide redundancy of the layer three switching component.

* * * * *